United States Patent
Suginome et al.

(10) Patent No.: US 12,366,683 B2
(45) Date of Patent: *Jul. 22, 2025

(54) LENS UNIT HAVING GLASS LENS AND COMBINED RESIN LENS

(71) Applicant: Maxell, Ltd., Kyoto (JP)

(72) Inventors: Takayuki Suginome, Otokuni-gun (JP); Osamu Nakayama, Otokuni-gun (JP); Susumu Shibasaki, Otokuni-gun (JP); Masashi Yoshimura, Otokuni-gun (JP)

(73) Assignee: MAXELL, LTD., Kyoto (JP)

( * ) Notice: Subject to any disclaimer, the term of this patent is extended or adjusted under 35 U.S.C. 154(b) by 69 days.

This patent is subject to a terminal disclaimer.

(21) Appl. No.: 18/233,044

(22) Filed: Aug. 11, 2023

(65) Prior Publication Data
US 2023/0384483 A1 Nov. 30, 2023

Related U.S. Application Data

(63) Continuation of application No. 16/759,564, filed as application No. PCT/JP2018/039626 on Oct. 25, 2018, now Pat. No. 11,768,317.

(30) Foreign Application Priority Data

Oct. 25, 2017 (JP) ................................. 2017-206593

(51) Int. Cl.
*G02B 13/00* (2006.01)
*G02B 1/11* (2015.01)
(Continued)

(52) U.S. Cl.
CPC .................. *G02B 1/11* (2013.01); *G02B 1/14* (2015.01); *G02B 7/021* (2013.01); *G02B 13/006* (2013.01);
(Continued)

(58) Field of Classification Search
CPC ...... B29D 11/000403; B29D 11/00865; B60R 2011/004; G02B 1/11; G02B 1/14;
(Continued)

(56) References Cited

U.S. PATENT DOCUMENTS 11,768,317 B2 * 9/2023 Suginome .............. G02B 7/025
359/614
2004/0223074 A1 11/2004 Takada
(Continued)

FOREIGN PATENT DOCUMENTS

| CN | 102186668 A | 9/2011 |
| CN | 103885098 A | 6/2014 |

(Continued)

OTHER PUBLICATIONS

Jan. 29, 2019 International Search Report issued in International Patent Application No. PCT/JP2018/039626.
(Continued)

*Primary Examiner* — Ryan S Dunning
(74) *Attorney, Agent, or Firm* — Oliff PLC

(57) ABSTRACT

An improved lens unit can be used in an in-vehicle camera or the like, in a condition where a forefront lens is exposed to the outside for a long time. Here, the resin lens within the lens unit has an improved durability at a high temperature. The lens unit has a plurality of lenses arranged side by side with the optical axes thereof aligned with each other. The lenses include glass lens and resin lens. The lens closest to the object is a glass lens which is closest to the object side and is coated with an ultra-hard film. Resin lenses each have a high temperature resistant reflection preventing film. The lens is a combined lens in which a lens and a lens are bonded together, and is then covered with a high temperature resistant reflection preventing film after bonding.

10 Claims, 6 Drawing Sheets

(51) Int. Cl.
*G02B 1/14* (2015.01)
*G02B 7/02* (2021.01)
*G02B 13/18* (2006.01)
*B29D 11/00* (2006.01)
*B60R 11/00* (2006.01)
*B60R 11/04* (2006.01)
*G02B 5/00* (2006.01)
*H04N 23/54* (2023.01)

(52) U.S. Cl.
CPC ........ *G02B 13/18* (2013.01); *B60R 2011/004* (2013.01); *B60R 11/04* (2013.01); *H04N 23/54* (2023.01)

(58) Field of Classification Search
CPC .. G02B 5/003; G02B 5/005; G02B 7/02–028; G02B 13/006; G02B 13/18; G02B 27/0988; G02B 2207/107; G03B 9/02; H04N 5/2253
See application file for complete search history.

(56) References Cited

U.S. PATENT DOCUMENTS

| | | |
|---|---|---|
| 2005/0105194 A1 | 5/2005 | Matsui et al. |
| 2006/0158748 A1 | 7/2006 | Hirata et al. |
| 2009/0141357 A1 | 6/2009 | Kamura et al. |
| 2011/0195239 A1 | 8/2011 | Takane et al. |
| 2012/0243077 A1 | 9/2012 | Osawa et al. |
| 2017/0227735 A1 | 8/2017 | Chou |

FOREIGN PATENT DOCUMENTS

| | | |
|---|---|---|
| CN | 206164672 U | 5/2017 |
| JP | 2008-233512 A | 10/2008 |
| JP | 2011-215505 A | 10/2011 |
| JP | 2013-20026 A | 1/2013 |
| JP | 2014-122971 A | 7/2014 |
| JP | 2014-228587 A | 12/2014 |
| JP | 2016-224388 A | 12/2016 |
| WO | 2010/044402 A1 | 4/2010 |

OTHER PUBLICATIONS

Jan. 12, 2021 Office Action issued in Japanese Patent Application No. 2019-551228.

Aug. 3, 2021 Office Action issued in Japanese Patent Application No. 2019-551228.

Jun. 23, 2021 Office Action issued in Chinese Patent Application No. 201880069397.6.

English translation of CN 206164672 U (Xu), retrieved from https://worldwide.espacenet.com/ on Jan. 22, 2022 (Year: 2017).

* cited by examiner

[Fig. 1]
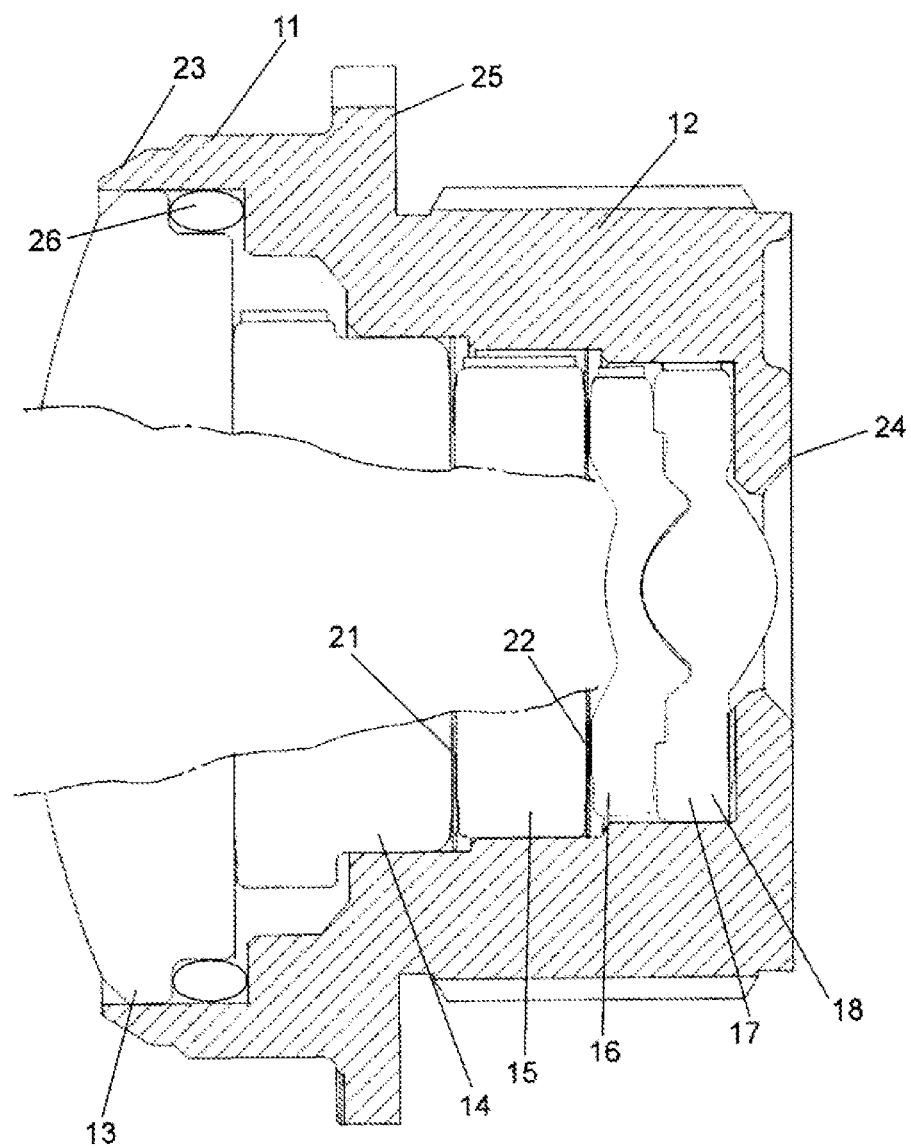

[Fig. 2]
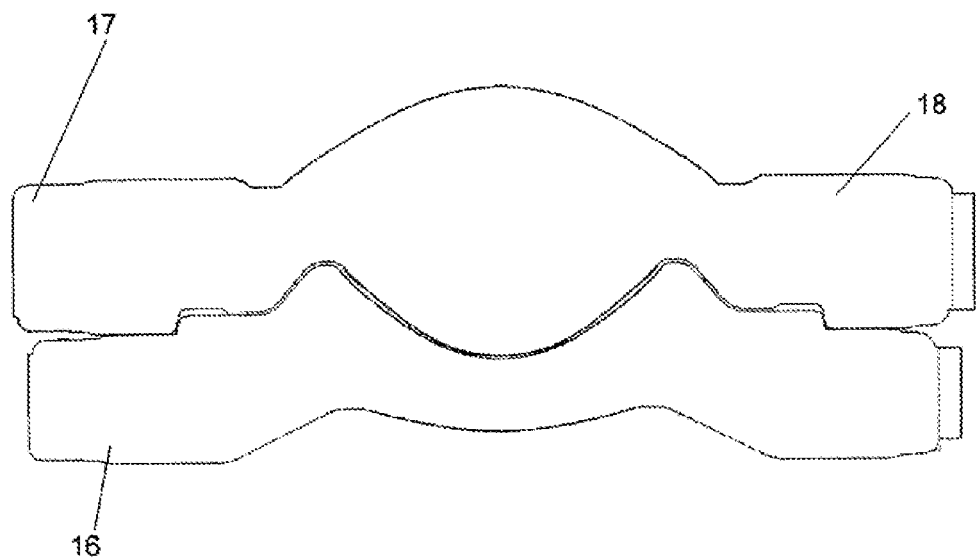

[Fig. 3]
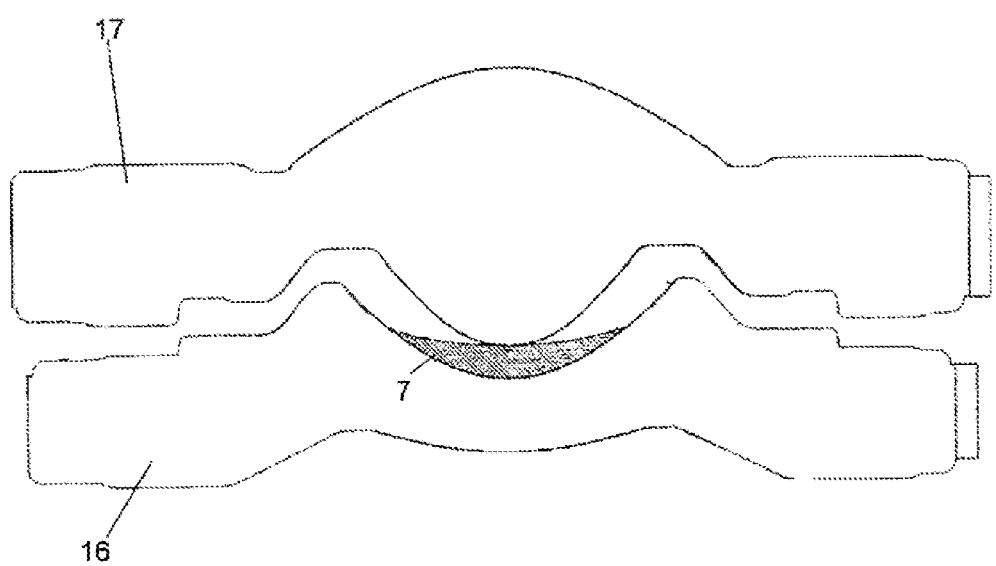

[Fig. 4]
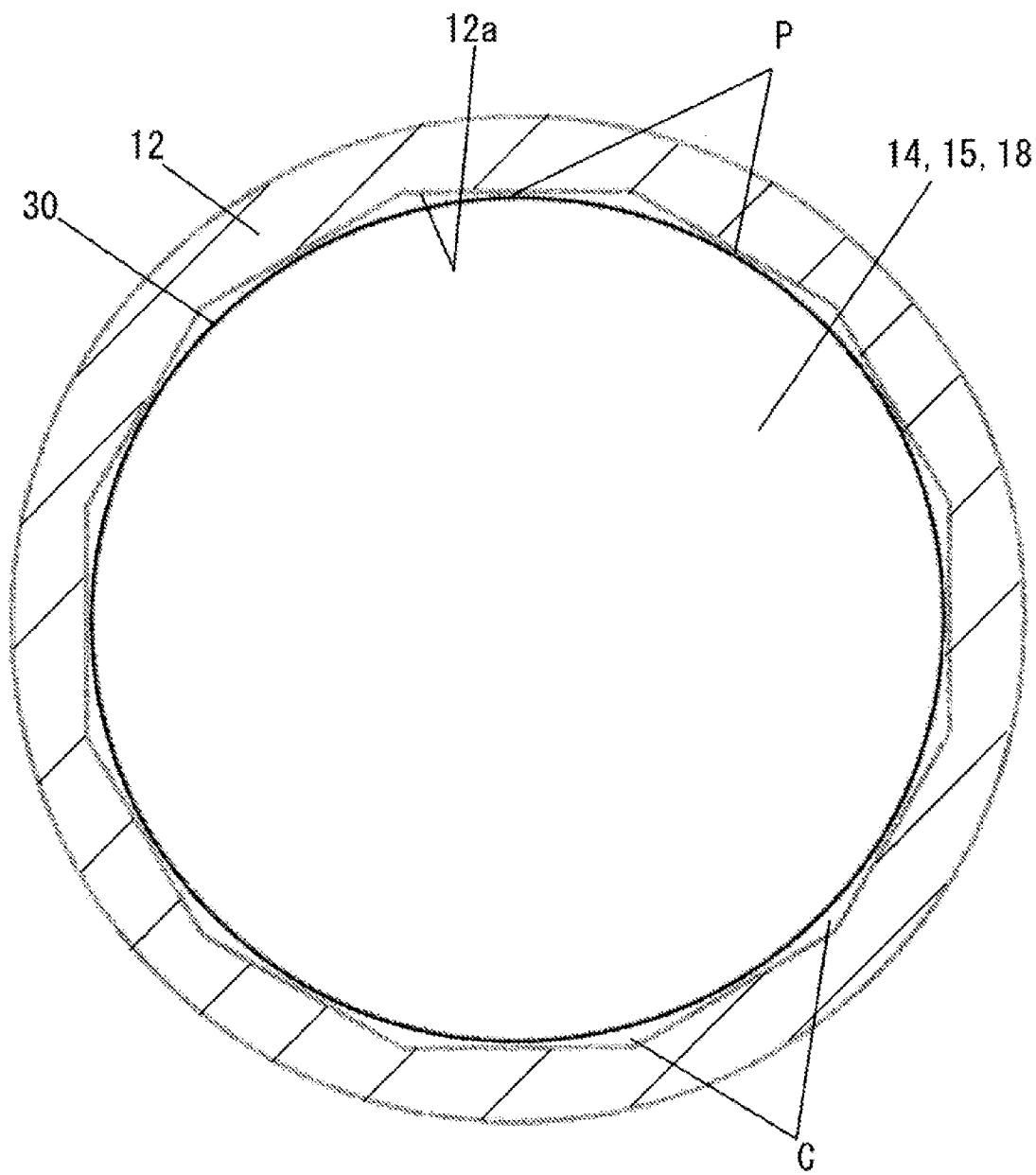

[Fig. 5]
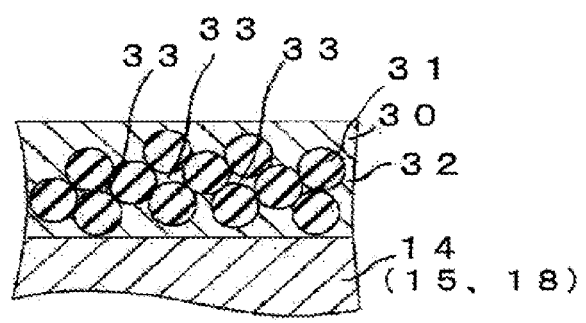

[Fig. 6]
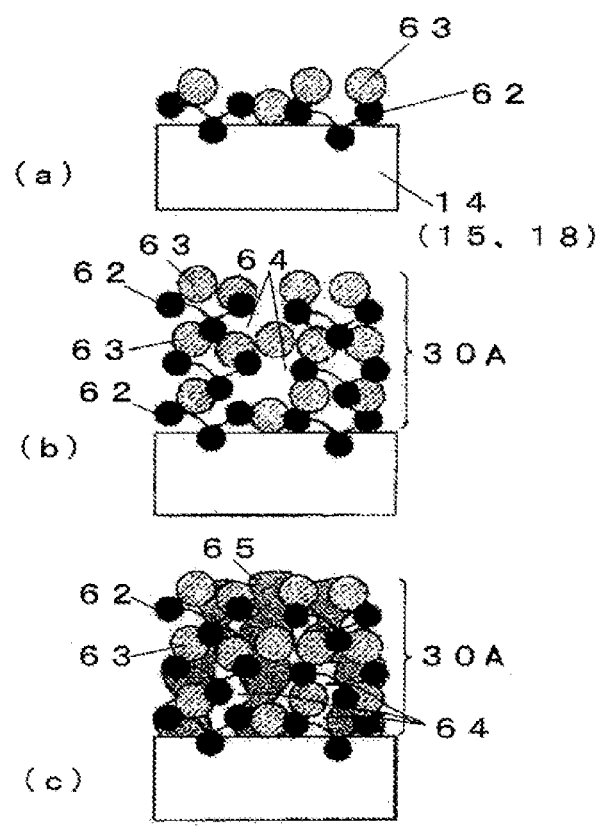

LENS UNIT HAVING GLASS LENS AND COMBINED RESIN LENS

RELATED APPLICATIONS

The present application is a continuation application of U.S. application Ser. No. 16/759,564 filed Apr. 27, 2020, which in turn is a U.S. national stage application of PCT/JP2018/039626 filed Oct. 25, 2018, claiming priority to Japanese Patent Application No. 2017-206593 filed Oct. 25, 2017. Each of these prior applications is incorporated herein by reference in its entirety.

TECHNICAL FIELD

The present invention relates to a lens unit for use in a camera.

BACKGROUND ART

In recent years, automobiles have used some in-vehicle cameras such as a camera for a back monitor, a camera for an automatic braking and a camera for an automatic driving. Since a vehicle in which a camera is mounted is assumed to travel in a harsh environment, an in-vehicle camera is required to be used in a harsh environment, such as at a high temperature. On the other hand, among a lens group constituting a lens unit for an in-vehicle camera, a lens closest to an object is often used in a state of being exposed from the vehicle, hence causing a possibility that the lens will be wounded.

In such an in-vehicle camera, a group of lenses including a plurality of lenses are usually glass lenses (e.g., see Patent Document 1). However, in some cases resin lens can be used for cost reduction.

Usually, a glass lens or a resin lens is coated with a reflection preventing film. Such reflection preventing film increases a light transmittance, improves a lens contrast, and prevents an occurrence of a ghost image, thus increasing the efficiencies of optical elements. The reflection preventing film is formed on the glass lens or the resin lens by vacuum deposition. Here, as the reflection preventing film, what is often used is, for example, a film in which $SiO_2$ layer and $LaTiO_3$ layer are alternately laminated, or a film in which $SiO_2$ layer and $Ta_2O_5$ layer are alternately laminated.

In forming the reflection preventing film by vacuum deposition, it is possible to coat only a part of lens surface. A forefront lens that is exposed to the outside of the vehicle is coated with a reflection preventing film and is handled in a water-repellent treatment to be strong against water such as rain or car washing.

CITATION LIST

Patent Document

Patent Document 1: JP-A-2016-224388

SUMMARY OF THE INVENTION

Technical Problems

However, in a heat resistance test on resin lens described above, the reflection preventing film will crack at 125° C. which is an example of an upper limit of a specified temperature range, while the cracking is caused due to a difference in thermal expansion coefficient between the resin lens and the reflection preventing film.

The present invention has been accomplished in view of the above-discussed circumstances, and it is an object of the present invention to provide an improved lens unit, which can be used in an in-vehicle camera or the like when the forefront lens is exposed to the outside for a long time, thus allowing a resin lens to have an improved durability at a high temperature.

Solution to the Problems

In order to solve the aforementioned problem, an improved lens unit is provided in which a plurality of lenses are arranged side by side with optical axes thereof aligned with each other, wherein the lenses include glass lens and resin lens, and a lens closest to an object is a glass lens, while resin lenses accommodated inside a lens barrel, except for the glass lens, are each provided with a high temperature resistant reflection preventing film.

According to such a configuration, the lens that is most exposed to the outside on the object side is a glass lens, and resin lens can be mainly used for other lenses. Therefore, it is possible to reduce the manufacturing cost by using the resin lenses while at the same time preventing the resin lenses from being easily wounded, which will otherwise be caused when exposed. Further, the resin lenses within the lens barrel are coated with a high temperature resistant reflection preventing film (though it is more likely wounded than a hard coat). Thus, it becomes possible to obtain an effect of improving the optical characteristics by using the reflection preventing film even at a high temperature, while at the same time avoiding a possible damage which will otherwise be caused due to contact between the lens and other objects, thus maintaining a desired performance of the lens unit even at a high temperature.

According to the configuration of the present invention, it is preferable that the high temperature resistant reflection preventing film has a heat resistance of 125° C. or higher.

According to the above configuration, it becomes possible to suppress a cracking of the high temperature resistant reflection preventing film at 125° C., thus maintaining a desired performance of the lens unit even at a high temperature. Here, the cracking is not only due to the heat resistance of the high temperature resistant reflection preventing film, but also due to a difference in the coefficient of thermal expansion between the resin lens and the high temperature resistant reflection preventing film. Preferably, after having been provided on the resin lens, the high temperature resistant reflection preventing film does not crack at least at a temperature of 125° C. or less. Moreover, it is preferable that even a single material of the high temperature resistant reflection preventing film will not be wounded due to a heat at a temperature of 125° C. or less. On the other hand, when temperature exceeds 125° C., it is preferable that the high temperature resistant reflection preventing film will not be damaged due to a heat. However, it is not required to have a heat resistance at 140° C. or higher or even 150° C. or higher.

In the present invention, the high temperature resistant reflection preventing film comprises a plurality of inorganic particles, air layers, and one of organic compound, inorganic compound, and inorganic polymer, the inorganic particles have a volume ratio of 5-74% in the high temperature resistant reflection preventing film, the air layers are formed between the inorganic particles adjacent to each other and has a volume ratio of 65% or less, each of the organic compound, inorganic compound, and inorganic polymer is formed by binding together the inorganic particles or the inorganic particles and the air layers, has a lower Young's modulus than the inorganic particles, and a volume ratio of 5-95%.

Using the above configuration, it is possible for the high temperature resistant reflection preventing film to have a desired flexibility and a desired ductility, as well as an excellent heat resistance. As a result, it becomes possible to prevent the high temperature resistant reflection preventing film from cracking at a high temperature. At this time, since the air layers (voids) are formed between inorganic particles adjacent to each other, even if the lenses on which the high temperature resistant reflection preventing film has been formed will expand or contract due to a temperature change, the high temperature resistant reflection preventing film can follow such an expansion or contraction. In this way, it is possible to prevent the high temperature resistant reflection preventing film from being damaged. On the other hand, it is preferable that such a high temperature resistant reflection preventing film be formed on the lenses by means of immersion.

Further, in the above configuration of the present invention, the high temperature resistant reflection preventing film is composed of fine particle-laminated thin film having voids. The fine particle-laminated thin film is formed by alternately adsorbing electrolyte polymer and fine particles, thus bonding them on to lens in a laminated state.

Using the above configuration, it is possible for the high temperature resistant reflection preventing film to have a desired flexibility and a desired ductility, as well as an excellent heat resistance. At this time, since the air layers (voids) have been formed, even if the lenses on which the high temperature resistant reflection preventing films have been formed will expand or contract due to a temperature change, the high temperature resistant reflection preventing films can follow such an expansion or contraction. In this way, it is possible to prevent the high temperature resistant reflection preventing films from being damaged. On the other hand, it is preferable that such high temperature resistant reflection preventing films be formed on the lenses by means of immersion.

Each high temperature resistant reflection preventing film has a high heat resistance, but is very soft and brittle due to its structure, making it to be easily scratched and peeled off even with a slight contact.

In the present invention, the most object side (front side) glass lens which is exposed to the outside and has a possibility of being contacted by the outside world, is not provided with a high temperature resistant reflection preventing film, while each inner glass lens which has no possibility of being contacted by the outside world is provided with a high temperature resistant reflection preventing film. In this way, it is possible to provide an improved lens unit, which can suppress a cracking of the high temperature resistant reflection preventing film at a high temperature, while at the same time preventing the film from being wounded due to a contact. Thus, the lens unit has an increased durability at a high temperature, and has excellent optical characteristics durable under high temperatures.

In the above configuration of the present invention, it is preferable that only the lens closest to the object is glass lens, and all the remaining lenses are resin lenses.

According to such a configuration, it is possible to provide a high temperature resistant reflection preventing film on each resin lens (all inner lenses) except for the glass lens which is exposed to the outside, thereby making it possible to reduce the manufacturing cost.

In the present invention, the resin lenses include a combined lens in which a plurality of the resin lenses are bonded to each other, and a high temperature resistant reflection preventing film is provided only on an outer surface of the combined lens, not provided between the bonded resin lenses.

According to the above configuration, it is possible to suppress an inconvenience possibly caused by disposing a high temperature resistant reflection preventing film with an adhesive layer interposed between the resin lenses constituting the combined lens. In fact, the coating is not based on vacuum deposition. When a high temperature resistant reflection preventing film is to be formed, it is difficult to coat only one surface of each lens having two surfaces. Therefore, when a high temperature resistant reflection preventing film is to be formed (by means of immersion) on each of the resin lenses before being bonded together, the high temperature resistant reflection preventing film will be undesirably applied to the surfaces to be later bonded to each other. This will also cause an undesired bonding between the high temperature resistant reflection preventing films.

In this case, since a high temperature resistant reflection preventing film is disposed between resin lenses (which are to be later bonded to each other) with an adhesive layer interposed therebetween, a related medium will not be air but will be the adhesive, making the mediums to have different refractive indexes. Namely, there will be a change in the refractive index from 1.0 (refractive index of air) to 1.5 (refractive index of adhesive), causing an undesired influence such as ghost to optical characteristics.

Accordingly, if a high temperature resistant reflection preventing film is formed by immersion after bonding the lenses together, the high temperature resistant reflection preventing film will not enter between the lenses (if the gaps between the lenses is filled with the adhesive), resulting in a condition in which a high temperature resistant reflection preventing film is formed only on the outer surface of the combined lens, thereby avoiding the above-described problem.

In the above configuration of the present invention, it is preferable that an ultra-hard film is applied to the glass lens which is closest to the object.

According to such a configuration, it is possible to provide a lens unit which is highly durable and inexpensive, by making a lens (that is most exposed to the outside on the object side) to be a glass lens, and by using many low-cost resin lenses. At this time, by applying an ultra-hard film to the glass lens which is closest to the object side, the surface of the glass lens can be covered with the ultra-hard film, so that the glass lens will not be easily wounded, thus ensuring an increased durability for the glass lens which is exposed to the outside, thereby inhibiting a performance degradation that will be possibly caused due to a wound.

In the configuration of the present invention, it is preferable that the ultra-hard film of the glass lens has a Mohs hardness of 8 or more.

According to such a configuration, it is possible to suppress a damage which will possibly be caused due to a certain degree of a friction caused by vehicle traveling or car washing, thus making it possible to maintain the performance of the lens unit for a long time.

In the above configuration of the present invention, it is preferable that the lens barrel has an internal peripheral surface that is in point contact with the resin lenses on which the high temperature resistant reflection preventing films have been formed, as viewed from the optical axis direction. At this time, it is more preferable that the internal peripheral surface of the lens barrel that comes into contact with the high temperature resistant reflection preventing films be formed into a polygonal shape.

As described above, when a high temperature resistant reflection preventing film (that is very soft and brittle and easily peels off due to its structure) is formed over the entire surface of lens by immersion, if the inner peripheral surface of the lens barrel (that holds the lenses) is circular, since the lens barrel will form a surface contact with the lenses, when the lens is inserted into the lens barrel and assembled or during vibration tests or the like, the high temperature resistant reflection preventing film formed on the side of each lens will rub against the inner peripheral surface of the lens barrel, causing a possibility that the film will peel off the lenses and become some foreign matters, leading to a poor appearance and a deteriorated optical performance. However, if the inner peripheral surface of the lens barrel in contact with the high temperature resistant reflection preventing films is formed in a polygonal shape as in the present invention, since the lens barrel comes into a point contact with the lens, an area of contact between the lens barrel and the lens is small, making it possible to prevent the high temperature resistant reflection preventing films from peeling off (falling). In this case, it is preferable that the number of corners of the polygon of the lens barrel is 8-14. If the number of corners is less than 8, the gap between the side surface of the lens and the inner peripheral surface of the lens barrel becomes large, and the lens barrel becomes large in diameter. On the other hand, if the number of corners is larger than 14, an area of contact between the high temperature resistant reflection preventing film formed on the side surface of each lens and the inner peripheral surface of the lens barrel will be increased, causing a result that the high temperature resistant reflection preventing film will easily peel off. Therefore, although depending on the size of non-circular portion on the outer periphery of the lens related to the gate at the time of molding the lens, it is more preferable that the inner peripheral surface of the lens barrel in contact with the high temperature resistant reflection preventing films has a dodecagonal shape. In this way, the seating (fitting state) of the lens with respect to the lens barrel is improved, and the lens can be easily inserted into the lens barrel.

Effects of the Invention

According to the present invention, it is possible to supply a lens unit having a high durability at a low cost.

BRIEF DESCRIPTION OF THE DRAWINGS

FIG. 1 is a sectional view showing a lens unit according to an embodiment of the present invention.

FIG. 2 is a cross-sectional view showing a combined lens.

FIG. 3 is a cross-sectional view showing a combined lens in the middle of a bonding process.

FIG. 4 is a sectional view showing the polygonal shape of a lens barrel.

FIG. 5 is an enlarged sectional view of a main part of a lens having a high temperature resistant reflection preventing film formed thereon.

FIGS. 6(a), 6(b) and 6(c) are each a view showing another high temperature resistant reflection preventing film, and is also a conceptual view showing a state of bonding between fine particles accompanying an application of silica sol.

DESCRIPTION OF EMBODIMENTS

Hereinafter, explanation will be given to embodiments of the present invention.

A lens unit 11 of the present embodiment shown in FIG. 1 is for use in an in-vehicle camera, and is installed outside a vehicle with at least an object-side end of the lens unit 11 being exposed.

As shown in FIG. 1, a lens unit 11 of the present embodiment includes a substantially cylindrical lens barrel 12 and a plurality of (for example, four) lenses 13, 14, 15, and 18 disposed within the lens barrel 12, as well as a plurality (for example, two) of throttle members 21 and 22. This in-vehicle camera including the lens unit 11 has the above-described lens unit 11, a board having an image sensor (not shown), and an installation member (not shown) for installing the board in a vehicle such as an automobile.

The plurality of lenses 13, 14, 15, and 18 fixed in and supported by the lens barrel 12 are arranged such that their optical axes are aligned with each other. The lenses 13, 14, 15 and 18 are arranged side by side along one optical axis to form a group of lenses for use in imaging. Further, the lens 18 is a combined lens assembly in which the lens 16 and the lens 17 are combined together. Here, the combined lens is formed by bonding together the lens surfaces of different lenses with an adhesive interposed therebetween, thus making it possible to correct a chromatic aberration and the like with a smaller number of lenses.

Among the two throttle members 21 and 22, the first throttle member 21 from the object side (front end of the lens barrel 12) is disposed between the second lens 14 and the third lens 15 from the object side. The second throttle member 22 from the object side is disposed between the third lens 15 and the fourth lens 16 from the object side. Here, the throttle members 21, 22 are "aperture throttles" for limiting an amount of transmitted light and for determining an F-number serving as an index of brightness. Alternatively, the throttle members 21 and 22 are "light-blocking throttles" for blocking light rays that may cause ghosts and aberrations.

The inner diameter of the lens barrel 12 is reduced by caulking one end thereof on the object side, and the inner diameter of the lens barrel 12 on the object side is smaller than the outer diameter of the most object side lens 13 (front lens) received within the lens barrel 12. Further, at the rear end of the lens barrel 12 on the image side, a frame portion 24 is provided which has an opening smaller in diameter than the combined lens 18. Using the frame portion 24, the plurality of lenses 13, 14, 15, and 18 constituting the lens group, as well as the throttle members 21, 22, may be held within the lens barrel 12. On the other hand, another frame member 23 may be attached to the end of the lens barrel 12 on the object side thereof after the lenses 13, 14, 15, and 18 are received into the lens barrel 12.

On the outer peripheral surface of the lens 13 which is closest to the object side, a reduced diameter portion having a reduced diameter is formed on the image side of the lens 13, and an O-ring 26 serving as a seal member is provided on the reduced diameter portion. Thus, between the outer peripheral surface of the lens 13 and the inner peripheral surface of the lens barrel 12, a sealed condition is formed on the object-side end of the lens barrel 12. In this way, it is possible to prevent fine particles such as water drops and dust from entering the lens barrel 12 from the end of the lens unit 11 on the object side.

The inner diameter of the lens barrel 12 gradually decreases from the object side to the image side. Correspondingly, the outer diameters of the lenses 13, 14, 15, and 18 decrease as the positions thereof move from the object side to the image side. Basically, the outer diameter of each of the lenses 13, 14, 15, 18 is substantially equal to the inner diameter of each of the portions of the lens barrel 12 where the lenses 13, 14, 15, 18 are supported. However, the inner peripheral surface of the lens barrel 12 is not cylindrical, but polygonal, such as dodecagonal. On the outer peripheral surface of the lens barrel 12, a flange portion 25 for use in attaching the lens barrel 12 into an in-vehicle camera is provided in the form of a flange on the outer peripheral surface of the lens barrel 12.

In the present embodiment, among the lenses 13, 14, 15, and 18, the lens 13 exposed to the outside of the vehicle and positioned closest to the object side (outside the lens barrel 12) is a glass lens formed by glass molding or polishing, while the lenses 14, 15, and the combined lens 18 are resin lenses formed by resin molding.

The most image-side surface of the combined lens 18 closest to the image side serves as a reference surface and is orthogonal to the optical axis. The reference surface of the combined lens 18 is provided at the image-side end of the lens barrel 12, and abuts against a reference surface on the inner surface side of the frame 24 which has an opening with its inner diameter being smaller than the outer diameter of the combined lens 18.

In the present embodiment, as shown in FIG. 2, the combined lens 18 is formed by bonding a concave lens 16 on the object side onto a convex lens 17 on the image side, using an adhesive 7 (shown in FIG. 3).

For use as the lens 13 on the front side (object side), it is possible to use, for example, an optical glass. In particular, it is possible to employ an optical glass for use as a lens, which may be combined with other lenses 14, 15, and 18. The lens 13 may be a glass lens harder than resin lens, and the glass lens is provided with an ultra-hard film. The Mohs hardness of the ultra-hard film is 8.0 or more.

The ultra-hard film has a six-layer structure which may be obtained by alternately forming $Si_3N_4$ layer and $SiO_2$ layer on the glass. In fact, the ultra-hard film is a super hard substance since it contains nitride. A method for forming the sutra-hard film is sputtering. However, it is difficult to form such an ultra-hard film on a resin lens since a temperature for forming the film is extremely high.

In the present embodiment, the lenses 14, 15, and the lenses 16, 17 constituting the combined lens 18 are resin lenses.

The lenses 14, 15 and the combined lens 18 are each provided with a high temperature resistant reflection preventing film. The high temperature resistant reflection preventing film may be formed by, for example, a wet type coating, which can be effected by immersing the lenses in a raw material solution. The high temperature resistant reflection preventing film has a high temperature resistance, but is very soft and brittle due to its structure, so that even a slight touch can easily cause it to be scratched and peeled off. Accordingly, in the present embodiment, the lens 13 closest to the object side, which is exposed to the outside and has a possibility of being touched from the outside, is not provided with a high temperature resistant reflection preventing film. In fact, only the lenses 14, 15 and the combined lens 18, which are inner lenses having no possibility of being touched from the outside, are each provided with a high temperature resistant reflection preventing film.

Here, the combined lens 18 has a shape shown in FIG. 2 and is formed by bonding together a meniscus lens 16 and a biconvex lens 17 shown in FIG. 3. In particular, the high temperature resistant reflection preventing film is not attached to the two lenses 16, 17 individually. Instead, the two lenses 16, 17 are at first bonded together to form one combined lens, and then the combined lens is coated with a high temperature resistant reflection preventing film. Namely, when bonding together the lens 16 and the lens 17 as shown in FIG. 3, the surfaces of the lenses 16, 17 have not yet been coated with the high temperature resistant reflection preventing films, while the lens 16 and the lens 17 are bonded together with an adhesive 7 interposed therebetween. Subsequently, the combined lens 18 shown in FIG. 2 is immersed in a raw material solution to form a high temperature resistant reflection preventing film, thus forming the desired reflection preventing film which is high temperature resistant.

Therefore, the bonding clearance between the lens 16 and the lens 17 is filled with the adhesive without any gap formed therebetween. In this way, during immersion, the immersion solution cannot enter between the lenses 16, 17. As a result, at least the image-side lens surface of the lens 16 and the object-side lens surface of the lens 17, which are to be bonded together, will not be provided with the high temperature resistant reflection preventing films, while only the outer surface of the combined lens 18 will be provided with the high temperature resistant reflection preventing film. Consequently, even when a high temperature resistant reflection preventing film is formed by wet-coating based on immersion, the high temperature resistant reflection preventing film can be prevented from forming on the bonding surfaces of the lenses 16 and 17, thereby making it possible to avoid an undesired effect caused by the high temperature resistant reflection preventing film on the bonding surfaces of the lenses 16 and 17. Namely, the high temperature resistant reflection preventing film is designed to increase the light transmittance on the premise that it is in contact with air layers, thus preventing an undesired effect in which the transmittance is lowered when the high temperature resistant reflection preventing film is in contact with the adhesive layer. On the other hand, there is not always an adhesive between the lens 16 and the lens 17 outside the lens surface which is an effective area as an optical element. As a result, there is a possibility that a high temperature resistant reflection preventing film will be formed between the lens 16 and the lens 17. At this time, there would not be any problem because this is an area outside a region through which necessary light beam passes. On the other hand, even if a high temperature resistant reflection preventing film is formed by a method other than the wet coating (immersion) (for example, vapor deposition or the like can be used), the high temperature resistant reflection preventing film may still be formed after the lens 16 and the lens 17 are bonded together.

Here, though the combined lens 18 of the present embodiment is formed by bonding together the meniscus lens 16 and the biconvex lens 17, but this should not be a limitation to the present invention. In fact, it is also possible to form the combined lens by bonding together the convex surface of one lens and the concave surface of the other. In addition, it is further possible to form a combined lens by including not only two lenses, but also three or more lenses.

As described above, in the present embodiment, among the lenses 13, 14, 15, and 18 which together constitute the lens group, the surfaces of the resin lenses 14, 15, and 18 that are not exposed to the outside (i.e., surfaces facing the object side) are each provide with the high temperature resistant reflection preventing film 30 (shown in FIG. 5). Of course, the high temperature resistant reflection preventing film 30 may be formed on the glass lens 13 positioned at the object side end of the lens barrel 12, followed by forming thereon an ultra-hard film. In addition, a high temperature resistant reflection preventing film 30 may be provided on the back surface of each of resin lenses 14, 15, and 18, and is preferably provided on both the front and back surfaces of each lens when the film is formed by wet coating based on immersion.

Further, as described above, the inner peripheral surface of the lens barrel 12 is not cylindrical, but polygonal, such as dodecagonal. Namely, as clearly shown in FIG. 4, the lens barrel 12 has a polygonal inner peripheral surface 12*a* that comes into contact with the high temperature resistant reflection preventing films 30 attached to the resin lenses 14, 15, and 18. As described above, when a high temperature resistant reflection preventing film 30, which is very soft and brittle and easily peels off due to its structure, is formed over the entire surface of the lenses 14, 15, and 18 by immersion, if the inner peripheral surface 12*a* of the lens barrel 12 holding the lenses 14, 15, and 18 is cylindrically circular, the lens barrel 12 will come into surface contact with the lenses 14, and 18. When the lenses 14, 15, and 18 are inserted into the lens barrel 12 and assembled therein, or when a vibration test is carried out, the high temperature resistant reflection preventing films 30 formed on the side surfaces of the lenses 14, 15, 18 will rub against the inner peripheral surface 12*a* of the lens barrel 12, and peels off the lenses 14, 15, 18. As a result, stripped materials caused by the peeling-off will become undesirable foreign matters, leading to a poor appearance and a decreased optical performance. However, as in the present embodiment, if the inner peripheral surface 12*a* of the lens barrel 12 in contact with the high temperature resistant reflection preventing films 30 attached to the resin lenses 14, 15, 18 is formed in a polygonal shape, the lens barrel 12 will come into contact with the lenses 14, 15 and 18 at the points P, so that the contact area between the lens barrel 12 and the lenses 14, 15, 18 is reduced, and peeling (dropping) of the high temperature resistant reflection preventing film can thus be prevented. At this time, the number of inner corners of the polygon of the lens barrel 12 is preferably 8-14. if the number of the inner corners is less than 8, gaps C between the side surfaces of the lenses 14, 15, 18 and the inner peripheral surface 12*a* of the lens barrel 12 will become large, and the lens barrel 12 itself will thus look larger. On the other hand, if the number of the inner corners is larger than 14, the contact area between the high temperature resistant reflection preventing films 30 formed on the side surfaces of the lenses 14, 15, 18 and the inner peripheral surface 12*a* of the lens barrel 12 becomes large, resulting in an easy peeling-off of the high temperature resistant reflection preventing film 30. Therefore, although depending on the size of non-circular portion (not shown) on the outer periphery of the lens related to the gate at the time of molding the lens, it is more preferable that the inner periphery surface 12*a* of the lens barrel 12 in contact with the high temperature resistant reflection preventing films 30 attached to the resin lenses 14, 15, 18 is a dodecagon shown in FIG. 4. In this way, the seating (fitting state) of the lenses 14, 15, and 18 with respect to the lens barrel 12 is improved, and the lenses 14, 15, and 18 can be more easily inserted into the lens barrel 12. The gaps C between the lenses 14, 15, 18 and the lens barrel 12, which are formed by making the inner peripheral surface 12*a* of the lens barrel 12 into a polygon, allow the lens to be easily inserted into the lens barrel 12. This is very beneficial because it improves the insertion performance of the lenses. Further, it is preferable the polygon is regular polygon and the intervals between the contact points P are equal to each other. Thus, the lenses 14, 15, and 18 can be held in a well-balanced manner by the lens barrel 12, while a biased distortion and the like can be suppressed.

It is sufficient that the lenses 14, 15, and 18 are held in contact with the inner surface of the barrel 12 at the contact points P. Therefore, it is not necessary for the inner peripheral surface 12*a* of the lens barrel 12 to be polygonal as long as the lenses are brought into point contact at the contact points P. For example, point contact can be realized by providing convex ribs extending in the optical axis direction at equal intervals on the inner peripheral surface 12*a* of the lens barrel 12. On the other hand, if a shape connecting the contact points P is a polygon, it is preferable to form a regular polygon.

The high temperature resistant reflection preventing films 30 formed on the surfaces of the resin lenses 14, 15, and 18 includes a plurality of inorganic particles having a volume ratio of 5-74% in the film, and a plurality of air layers having a volume ratio of 65% or less, and one of organic compound, inorganic compound and inorganic high molecular compound. These materials are formed by binding the inorganic particles or binding together the inorganic particles and the air layers, having a lower Young's modulus than the inorganic particles, and a volume ratio of 5-95%. However, description will be given in more detail below.

FIG. 5 is an enlarged sectional view of a main portion of lens near the light incident surface of the lens 14 (15, 18) on which the high temperature resistant reflection preventing films 30 have been formed. As illustrated, a high temperature resistant reflection preventing film 30 includes a plurality of inorganic particles 31, a binder 32, and a plurality of air layers (voids) 33. The viscoelasticity of the inorganic particles 31 is different from that of the binder 32. Specifically, the Young's modulus of the inorganic particles 31 is 50 GPa or more. The binder 32 has a Young's modulus which is 5 GPa or less.

The high temperature resistant reflection preventing film 30 contains a plurality of compositions having different viscoelasticities. Therefore, the high temperature resistant reflection preventing film 30 has a high strength and a high flexibility. The lens 14 (15, 18) made of resin expands due to heat. Since the Young's modulus of the binder 32 is low, the flexibility of the high temperature resistant reflection preventing film 30 is high. Therefore, even if the lens 14 (15,18) expands due to heat, the high temperature resistant reflection preventing film 30 will not be easily broken. Here, the Young's modulus of the inorganic particles 31 is 50 GPa or more. The inorganic particles 31 improve the strength of the high temperature resistant reflection preventing film 30 and suppress the scratches on the surface of the high temperature resistant reflection preventing film 30.

The binder 32 has an optical transparency and contains a plurality of inorganic particles 31. As described above, the Young's modulus of the binder 32 is 5 GPa or less. The binder 32 is an organic compound or an inorganic compound. The binder 32 is, for example, a resin. The resin comprises one or more substances selected from the group consisting of polyethyleneimine, polyallylamine, polyvinylamine, polyvinylpyridine, diallylamine polymer, maleic acid-diallylamine copolymer, polyvinyl alcohol, polyoxyethylene, polymethyl methacrylate, polymethyl acrylate, diacetyl cellulose, and triacetyl cellulose, nitrocellulose, polyester, alkyd resin, fluoroacrylate, fluoropolymer and the like. Fluoropolymers may be, for example, fluoroolefins (fluoroethylene, vinylidene fluoride, tetrafluoroethylene, perfluorooctylethylene, hexafluoropropylene, perfluoro-2,2-dimethyl-1,3-dioxole, etc.), completely or partially fluorinated vinyl ethers. The refractive index of the binder 32 is 1.35 or less, preferably 1.30 or less.

The binder 32 may be an inorganic polymer, for example, a silicon compound, a hydrolyzate thereof, or a polycondensate thereof. The silicon compound is, for example, a silane coupling agent. The silane coupling agent modifies the surface of the inorganic particles. In this way, the dispersion stability of the inorganic particles in the organic solvent is improved, and aggregation and sedimentation of the inorganic particles are suppressed.

The inorganic particles 31 may be, for example, an inorganic oxide or an inorganic fluoride. The inorganic oxide is, for example, cerium oxide, tantalum oxide, titanium oxide, silicon oxide, chromium oxide, aluminum oxide, tin oxide, yttrium oxide, bismuth oxide. The inorganic fluoride is, for example, magnesium fluoride, aluminum fluoride, lithium fluoride, sodium fluoride. The plurality of inorganic particles 31 include one or more substances selected from the above-described inorganic oxides and inorganic fluorides.

Preferably, the inorganic particles 31 are aluminum oxide and/or silicon oxide. Aluminum oxide and silicon oxide each have a low refractive index. Aluminum oxide has a refractive index of 1.7-1.9, and silicon oxide has a refractive index of 1.4-1.7. Therefore, it is possible for the refractive index of the high temperature resistant reflection preventing film 30 to be set at a low value.

If the size of the inorganic particles 31 is too large, the inorganic particles 31 tend to scatter light. This will also cause a considerable variation in the thickness of the high temperature resistant reflection preventing film 30. Therefore, an average size of the inorganic particles 31 is preferably 100 nm or less. The lower limit of the average size is preferably 8 nm. Such particle size can be determined, for example, by measuring the particle size of 100 inorganic particles arbitrarily extracted from a photographic image using a scanning electron microscope (SEM), followed by calculating an average value of the particle sizes.

The volume ratio of the inorganic particles 31 in the high temperature resistant reflection preventing film 30 is 5-74%. The volume ratio of the binder 32 in the high temperature resistant reflection preventing film 30 is 5-95%. The volume ratio of the air layers in the high temperature resistant reflection preventing film 30 is 65% or less.

If the volume ratio of the inorganic particles 31 is too small, the strength of the high temperature resistant reflection preventing film 30 will decrease. On the other hand, if the volume ratio of the inorganic particles 31 is too large, the flexibility of the high temperature resistant reflection preventing film 30 will decrease. Besides, if the volume ratio of the binder 32 is too small, the flexibility of the high temperature resistant reflection preventing film 30 will decrease. On the other hand, if the volume ratio of the binder 32 is too large, the strength of the high temperature resistant reflection preventing film 30 will decrease.

If the volume ratio of the inorganic particles 31 is 5-74%, the volume ratio of the binder 32 is 5-95%, and the volume ratio of the air layers is 65% or less, the high temperature resistant reflection preventing film 30 will have a desired flexibility and a desired strength. Therefore, the high temperature resistant reflection preventing film 30 will not be easily scratched, and the high temperature resistant reflection preventing film 30 will not be easily cracked even if the lens made of resin has been thermally expanded at a high temperature.

Here, the high temperature resistant reflection preventing film 30 is formed by a wet-coating process. Specifically, the high temperature resistant reflection preventing film 30 can be formed by applying a coating liquid constituting the high temperature resistant reflection preventing films 30 to the surfaces of the resin lenses 14, 15, and 18. The method of applying the coating liquid is, for example, an ink jet printing method, a spraying method, a spin coating method, a dip-coating method, a screen printing method, or the like.

Hereinafter, a method of forming the reflection preventing film by a dip-coating will be described below, serving as an example of a manufacturing method.

At first, a coating solution is prepared which contains the composition of the high temperature resistant reflection preventing film 30. A solvent for use in the coating solution is, for example, tetrahydrofuran (THF) or N, N-dimethylformamide (DMF). However, a solvent useful here should not be limited to these substances. In fact, a solvent may also be water. If a solvent is an organic solvent, the boiling point thereof is preferably 30-250° C. If the boiling point of an organic solvent is too low, the volatilization rate of the organic solvent will be too high. Accordingly, it will be difficult to form a high temperature resistant reflection preventing film 30 having a uniform thickness. On the other hand, if the boiling point of an organic solvent is too high, the organic solvent is difficult to volatilize. Consequently, it will be difficult to form the high temperature resistant reflection preventing film 30. Preferably, an organic solvent has a boiling point of 50-150° C.

Preferably, the coating liquid has a low viscosity and a low surface tension. The viscosity of the coating liquid is preferably 10 (mPa·s) or less, more preferably 1 (mPa·s) or less. The surface tension of the coating solution is preferably 70 (mN/m) or less, more preferably 20 (mN/m) or less. This is because when a holding member holding the resin lenses 14, 15, 18 is pulled up from a dipping tank filled with the coating liquid, the coating liquid should be quickly discharged from the holding member. Further, in order to control the viscosity and surface tensions of the coating solution, a surfactant or the like may also be added to the coating solution.

In the coating liquid, the weight part of the binder 32 is 1-100 and the weight part of the solvent is 2,000-100,000, with respect to 100 parts by weight of the inorganic particles 31. At this time, the volume ratio of the inorganic particles 31 in the high temperature resistant reflection preventing film will be 5-70%, and the volume ratio of the binder 32 will be 30-95%.

Next, a plurality of resin lenses 14, 15, and 18 are gripped by gripping members, and immersed in a dipping tank containing the coating liquid.

Subsequently, the plurality of immersed resin lenses 14, 18 are pulled out of the dipping tank at a constant speed. Thus, the coating liquid can be applied to the surfaces of the resin lenses 14, 15, and 18. On the other hand, a pulling speed at this time can be changed according to the thickness of the high temperature resistant reflection preventing films 30 to be formed on the surfaces of the resin lenses 14, 15 and 18.

Next, the coating liquid applied to the resin lenses 14, 18 is dried. The lifted resin lenses 14, 15, 18 are then baked at a predetermined temperature, thereby obtaining the high temperature resistant reflection preventing films 30.

In the high temperature resistant reflection preventing film 30, the inorganic particles 31 are in contact with each other. Air layers 33 are formed between adjacent inorganic particles 31. As described above, the volume ratio of the inorganic particles 31 in the high temperature resistant reflection preventing film 30 is 5-74%, but may also be less than 70%. The volume ratio of the binder 32 is 5-95%, but may also be less than 95%. If the volume ratio of the air layers 33 is too large, the strength of the high temperature resistant reflection preventing film 30 will decrease. Therefore, the volume ratio of the air layers 33 in the high temperature resistant reflection preventing film 30 should be 65% or less.

The air layers 33 are formed, for example, in accordance with a ratio of the binder 32 with respect to the inorganic particles 31 in the coating liquid. A preferable weight part of the binder 32 is 1-100 parts by weight with respect to 100 parts by weight of the inorganic particles in the coating liquid. In this case, after drying the coating liquid, the air layers 33 can be formed in the high temperature resistant reflection preventing film 30.

Since the refractive index of the air layers 33 is low, the refractive index of the high temperature resistant reflection preventing film 30 is also low, making it possible to further inhibit a light reflection.

In this way, the high temperature resistant reflection preventing film 30 will have a desired flexibility and an excellent heat resistance. As a result, it is possible to prevent the high temperature resistant reflection preventing film from cracking at a high temperature. At this time, since the air layers (voids) 33 is formed between the adjacent inorganic particles 31, even if the lenses 14, 15, and 18 on which the high temperature resistant reflection preventing films 30 have been formed will expand or shrink due to a temperature change, the high temperature resistant reflection preventing films 30 will confirm to such a change in the lenses. Therefore, it is possible to prevent the high temperature resistant reflection preventing films 30 from being broken.

FIGS. 6(a)-6(c) show the high temperature resistant reflection preventing film 30 of FIG. 5 in more detail by changing the viewpoint. The film shown here is basically the same as the high temperature resistant reflection preventing film 30 shown in FIG. 5. However, in the following, description will be given to a structure and a film forming method for forming the high temperature resistant reflection preventing film 30A shown in FIGS. 6(a)-6(c). The high temperature resistant reflection preventing film 30A is composed of a fine particle-laminated thin film having voids. The fine particle-laminated thin film is characterized in that electrolyte polymer (binder) and the fine particles are alternately adsorbed, and then brought into contact with the alcoholic silica sol product, thereby allowing the lens to combine the fine particles and allowing the fine particles to combine each other.

Such fine particle-laminated thin film (high temperature resistant reflection preventing film) 30A may be formed as follows. As shown in FIGS. 6(a)-6(c), a fine particle-laminated thin film 30A having voids 64 is formed on the lens 14 (15, 18). The fine particle-laminated thin film 30A is formed such that the electrolyte polymer 62 (for example, a binder) and the fine particles 63 are alternately adsorbed, the lenses 14 (15, 18) are combined with the fine particles 63, and the fine particles 63 and the fine particles 63 are combined with each other via the alcoholic silica sol product 65 (for example, a binder). Hereinafter, each component of the fine particle-laminated thin film 30A will be described in more detail.

The fine particles for use in forming the fine particle-laminated thin film 30A preferably have an average primary particle diameter of 2-100 nm in a state of being dispersed in a solution. Preferably, in order to obtain a desired transparency for the fine particle-laminated thin film 30A, the particle size is 2-40 nm, more preferably 2-20 nm, from the viewpoint of ensuring a desired optical function for the fine particle-laminated thin film 30A.

Examples of the fine particles useful here include inorganic fine particles. Preferably, it is desired to use an oxide containing at least one element selected from the group consisting of silicon, aluminum, zirconium, titanium, niobium, zinc, tin, cerium and magnesium, thereby ensuring a desired transparency.

As the electrolyte polymer used here, it is possible to use a polymer having a charged functional group in the main chain or side chain. The electrolyte polymer solution may be obtained by dissolving an electrolyte polymer (containing a charge having a sign which is opposite to or the same as the surface charges of the fine particles) in water, an organic solvent, or a mixed solvent of a water-soluble organic solvent and water.

As an alcohol-based silica sol, it is possible to use 4, 3 and 2 functional alkoxysilanes, and condensates, hydrolysates and silicone varnishes of these alkoxysilanes. Preferably, the alcoholic silica sol product contains an alcoholic silica sol prepared by hydrolyzing at least one kind of lower alkyl silicate (represented by the following general formula) in methanol or ethanol.

$$(OR^1)n\ Si(R^2)_{4-n}(n=1\sim4) \tag{1}$$

(In the above formula, $R^1$ represents a methyl or an ethyl, $R^2$ represents a non-hydrolyzable organic group)

Further, the lenses 14, 15 and 18 may be used as they are, or their surfaces may be subjected to corona discharge treatment, glow discharge treatment, plasma treatment, ultraviolet irradiation, ozone treatment, chemical etching treatment with alkali or acid, silane coupling treatment, thereby introducing a polar functional group to make the surface charges of the lens negative or positive.

Here, in order to form the fine particle-laminated thin film 30A having voids, it is usual to employ, for example, a dip coating method. In fact, the fine particle-laminated thin film 30A can be formed by sequentially carrying out the following steps (1) to (3) (see FIGS. 6(a)-6(c)).

(1) A layer of electrolyte polymer 62 or a layer of fine particles 63 is formed on the lens 14 (15, 18) by carrying out a step of contacting or applying either the electrolyte polymer solution or the fine particle dispersion (FIG. 6(a)).

(2) A layer of fine particles 63 or a layer of electrolyte polymer 62 is formed by carrying out one of the following two steps. Step 1 is carried out by contacting or applying a dispersion of fine particles (having charges opposite to the electrolyte polymer of the electrolyte polymer solution) on the lens 14 (15, 18) which has been treated by contacting or applying the electrolyte polymer solution. Step 2 is carried out by contacting or applying a solution of an electrolyte polymer (having charges opposite to the fine particles of the fine particle dispersion) on a plastic substrate which has been treated by contacting or applying the fine particle dispersion. In this way, it is possible to form the layer of electrolyte polymer 62 or the layer of fine particles 63 on the lens 14 (15, 18)

(3) A step is carried out by contacting or applying the alcoholic silica sol product 65 to the lens 14 (15, 18) which has been treated by contacting or applying the electrolyte polymer solution or the fine particles. In this way, the lens 14 (15, 18) and the fine particles 63 may be combined together or the fine particles 63 may be combined with each other through the alcoholic silica sol product 65, as shown in FIG. 6(c).

In this way, the high temperature resistant reflection preventing film 30A will have a desired ductility and a desired flexibility and is excellent in heat resistance. As a result, it is possible to prevent the high temperature resistant reflection preventing film from cracking at a high temperature. At this time, owning to the presence of the voids 64, even if the lenses 14, 15, and 18 (on which the high temperature resistant reflection preventing films 30A have been formed) expand or contract due to a temperature change, the high temperature resistant reflection preventing films 30A will conform to such a change. Consequently, it is possible to prevent the high temperature resistant reflection preventing film 30A from being broken.

On the other hand, although the above-described high temperature resistant reflection preventing films 30, 30A both have a heat resistance of 125° C. or higher, it is preferable to select one of the two films which has a coefficient of thermal expansion close to the coefficients of thermal expansion of the resin lenses 14, 15, and 18.

Further, in the step of forming the fine particle-laminated thin film (high temperature resistant reflection preventing film) 30A shown in FIGS. 6(a)-6(c), the alcoholic silica sol product 65 was used to enhance the fixability of the film. Of course, it is also possible to form the high temperature resistant reflection preventing film 30A without using the alcoholic silica sol product 65. At this time, for example, an aqueous silica dispersion in which beaded silica fine particles having an average primary particle diameter of 8 nm measured by the BET method were dispersed (manufactured by Nissan Chemical Industries, Ltd., trade name: Snowtex (ST) OUP, Silica sol) was used as a negatively charged fine particle dispersion in which the concentration was adjusted to 1% by mass without adjusting the pH. Further, an aqueous solution is used as an electrolyte polymer solution in which 0.1% by mass of polydiallyldimethylammonium chloride (PDDA, manufactured by Aldrich) was adjusted to pH 10. Then, step (a) is carried out in which each of the lenses 14, 15, and 18 is immersed in the electrolyte polymer solution for 1 minute, and then showered with ultrapure water (for rising) for 1 minute. Subsequently, step (b) is carried out in which each of the lenses 14, 15, and 18 is immersed in the fine particle dispersion for 1 minute, followed by showering the lenses with ultrapure water for 1 minute. Thereafter, several cycles of step (a) and step (b) are performed. Here, step (a) once and step (b) once are defined as one cycle. The number of cycles is defined as the number of times for alternately laminating the fine particles. After alternately laminating the fine particles for 4 times, drying is performed at 25° C. for 24 hours. In this way, the fine particle laminated film 30A is formed on the surface of each of the lenses 14, 15, and 18. Namely, this manufacturing method includes a first step of rinsing after contacting an electrolyte polymer solution (binder solution) with the surfaces of the lenses 14, 15, and 18. After the first step, a second step of rising is carried out after contacting a dispersion of fine particles having a negative charge with the surfaces of the lenses 14, 15, and 18. Subsequently, a third step is carried out in which the first step and the second step are alternately repeated to form a fine particle-laminated film. In addition, optionally, a further step of rinsing may be carried out after contacting the electrolyte polymer solution (binder solution) with the fine particle-laminated film, thereby omitting the step of FIG. 6(c).

According to such a lens unit 11 of the present embodiment, the lens 13 exposed to the outside on the most object side is a glass lens coated with an ultra-hard film having a Mohs hardness of 8 or more, and will not be easily damaged even when exposed, thus ensuring a high durability. Since the lenses 14, 15, and 18 behind the lens 13 are not exposed to the outside, if we use a resin lens without a hard film, and if we apply a high temperature resistant reflection preventing film having a high temperature resistance and having a small difference in thermal expansion coefficient from the resin lens, it is possible to use a material which does not crack up to 125° C. Therefore, it becomes possible to supply the lens unit 11 at low cost, which is excellent in durability against friction and heat. Namely, it is possible to provide a lens unit suitable for use in an in-vehicle camera that can be used in an automobile which is required to travel even in a severe environment.

However, the present invention is not limited to the above-described embodiments, and can be implemented with various modifications without departing from the spirit of the invention. For example, some or all of the above-described embodiments may be combined with others without departing from the spirit of the present invention, or some of the components may be omitted from one of the above-described embodiments.

EXPLANATION OF REFERENCE NUMERALS

11 lens unit
13 lens (glass lens)
14 lens (resin lens)
15 lens (resin lens)
16 lens (resin lens)
17 lens (resin lens)
18 lens (resin lens: combined lens)

The invention claimed is:

1. A lens unit comprising a plurality of lenses arranged side by side with optical axes thereof aligned with each other,
   wherein the lenses include a glass lens and more than one resin lens, a lens closest to an object is the glass lens, the resin lenses are accommodated inside a lens barrel, and except for the glass lens, each lens is provided with a high temperature resistant reflection preventing film,
   wherein the high temperature resistant reflection preventing film comprises a plurality of inorganic particles, air layers, and binder that is at least one of organic compound, inorganic compound, and inorganic polymer,
   wherein the more than one resin lens includes a combined lens comprised of at least two resin lenses bonded to each other, wherein the high temperature resistant reflection preventing film is provided only on an outer surface of the combined lens and is not provided between the bonded resin lenses, and wherein the combined lens is the resin lens furthest from the glass lens,
   the inorganic particles have a volume ratio of 5-74% in the high temperature resistant reflection preventing film,
   the air layers are formed between the inorganic particles adjacent to each other and have a volume ratio so as to be present but no more than 65%,
   the binder binds together the inorganic particles or the inorganic particles and the air layers, has a lower Young's modulus than the inorganic particles, and has a volume ratio of 5-95%.

2. The lens unit according to claim 1, wherein the high temperature resistant reflection preventing film of each resin lens has a heat resistance of 125° C. or higher.

3. The lens unit according to claim 1, wherein the high temperature resistant reflection preventing film comprises a fine particle-laminated thin film having voids, while the fine particle-laminated thin film itself is formed by alternately adsorbing electrolyte polymer and the fine particles on to the lenses in a laminated state, and wherein the fine particles are the inorganic particles, the voids are the air layers and the electrolyte polymer is the binder.

4. The lens unit according to claim 1, wherein only the lens closest to the object is a glass lens, and all the remaining lenses are resin lenses.

5. The lens unit according to claim 1, wherein the inner peripheral surface of the lens barrel has a polygonal shape.

6. The lens unit according to claim 1, wherein the Young's modulus of the inorganic particles is 50 GPa or more and the Young's modulus of the binder is 5 GPa or less.

7. The lens unit according to claim 1, wherein the lens unit further comprises at least two throttle members selected from the group consisting of aperture throttles for limiting an amount of transmitted light and light-blocking throttles for blocking light rays, each throttle member being disposed between adjacent ones of the resin lenses except not between the resin lenses of the combined lens.

8. The lens unit according to claim 1, wherein the glass lens includes a reduced diameter portion accommodating a seal member between the reduced diameter portion and the lens barrel.

9. The lens unit according to claim 1, wherein an ultra-hard film is applied to the glass lens closest to the object.

10. The lens unit according to claim 9, wherein the ultra-hard film of the glass lens has a Mohs hardness of 8 or more.

* * * * *